US012498771B2

(12) United States Patent
Mundt et al.

(10) Patent No.: US 12,498,771 B2
(45) Date of Patent: Dec. 16, 2025

(54) APPARATUS FOR ADJUSTABLE DEPTH OF A MODULE WITHIN A CHASSIS

(71) Applicant: Dell Products L.P., Round Rock, TX (US)

(72) Inventors: Kevin Warren Mundt, Livingston, TX (US); Stephen Edward Strickland, Foxborough, MA (US)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 18/410,315

(22) Filed: Jan. 11, 2024

(65) Prior Publication Data

US 2025/0231597 A1    Jul. 17, 2025

(51) Int. Cl.
*G06F 1/18* (2006.01)
(52) U.S. Cl.
CPC .................................... *G06F 1/183* (2013.01)
(58) Field of Classification Search
None
See application file for complete search history.

(56) References Cited

U.S. PATENT DOCUMENTS

| | | | |
|---|---|---|---|
| 6,456,501 B1* | 9/2002 | Rubenstein | G11B 33/128 |
| | | | 361/801 |
| 7,190,574 B2* | 3/2007 | Muenzer | G06F 1/184 |
| | | | 361/679.33 |
| 2004/0257760 A1* | 12/2004 | Record | G11B 33/126 |

* cited by examiner

*Primary Examiner* — Xanthia C Relford
(74) *Attorney, Agent, or Firm* — McDermott Will & Schulte LLP

(57) ABSTRACT

An apparatus, including: a chassis, including a track; a midplane assembly, including: a connector; and locking mechanisms, wherein the midplane is coupled to the chassis; wherein when a first pluggable module is coupled to the connector of the midplane assembly, first rails of the first pluggable module are engaged with the track of the chassis and the locking mechanisms engage the chassis to place the first pluggable module in a first position with respect to the chassis, wherein when a second pluggable module is coupled to the connector of the midplane assembly, second rails of the second pluggable module are engaged with the track of the chassis and an extension of each of the second rails engages respective locking mechanisms to disengage the respective locking mechanisms from the chassis such that the midplane assembly is translatable with respect to the chassis to a second position differing from the first position.

20 Claims, 16 Drawing Sheets

APPARATUS FOR ADJUSTABLE DEPTH OF A MODULE WITHIN A CHASSIS

BACKGROUND

Field of the Disclosure

The disclosure relates generally to an apparatus for adjustable depth of a module within a chassis.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A new add-in card form factor is being developed that can be larger and intended for use with GPUs, DPUs, and memory expansion utilizing PCIe and CLX busses.

SUMMARY

Innovative aspects of the subject matter described in this specification may be embodied in an apparatus including a chassis, including a track; a midplane assembly, including: a connector; and locking mechanisms, wherein the midplane assembly is coupled to the chassis; a first pluggable module having a first length, the first pluggable module having first rails; and a second pluggable module having a second length greater than the first length, the second pluggable module having second rails, each of the second rails having an extension; wherein when the first pluggable module is coupled to the connector of the midplane assembly, the first rails of the first pluggable module are engaged with the track of the chassis and the locking mechanisms engage the chassis to place the first pluggable module in a first position with respect to the chassis, wherein when the second pluggable module is coupled to the connector of the midplane assembly, the second rails of the second pluggable module are engaged with the track of the chassis and the extension of each of the second rails engage respective locking mechanisms of the midplane assembly to disengage the respective locking mechanisms from the chassis such that the midplane assembly is translatable with respect to the chassis to a second position differing from the first position.

Other embodiments of these aspects include corresponding systems and apparatus.

These and other embodiments may each optionally include one or more of the following features. For instance, the midplane assembly further includes a printed circuit board (PCB), the PCB coupled to the connector. Further including a cable, the cable coupled between the PCB and a motherboard. Further including a spring coupled between the midplane assembly and the chassis. The midplane assembly further includes a plurality of protrusions, and the chassis including a plurality of elongated openings, wherein the protrusions of the midplane assembly are positioned within respective elongated openings, the elongated openings guiding translation of the midplane assembly with respect to the chassis. The locking mechanisms are engaged with respective openings of the chassis when the first pluggable module is in the first position with respect to the chassis. The locking mechanisms are disengaged from the respective opening of the chassis when the second pluggable module is in the second position with respect to the chassis. The locking mechanisms are pivotably coupled to the midplane assembly. The locking mechanisms are disengaged from the respective opening of the chassis when the extension of each of the second rails engage the respective locking mechanism to pivot the respective locking mechanisms from being engaged with the respective opening of the chassis. Each of the locking mechanisms is a locking pawl.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
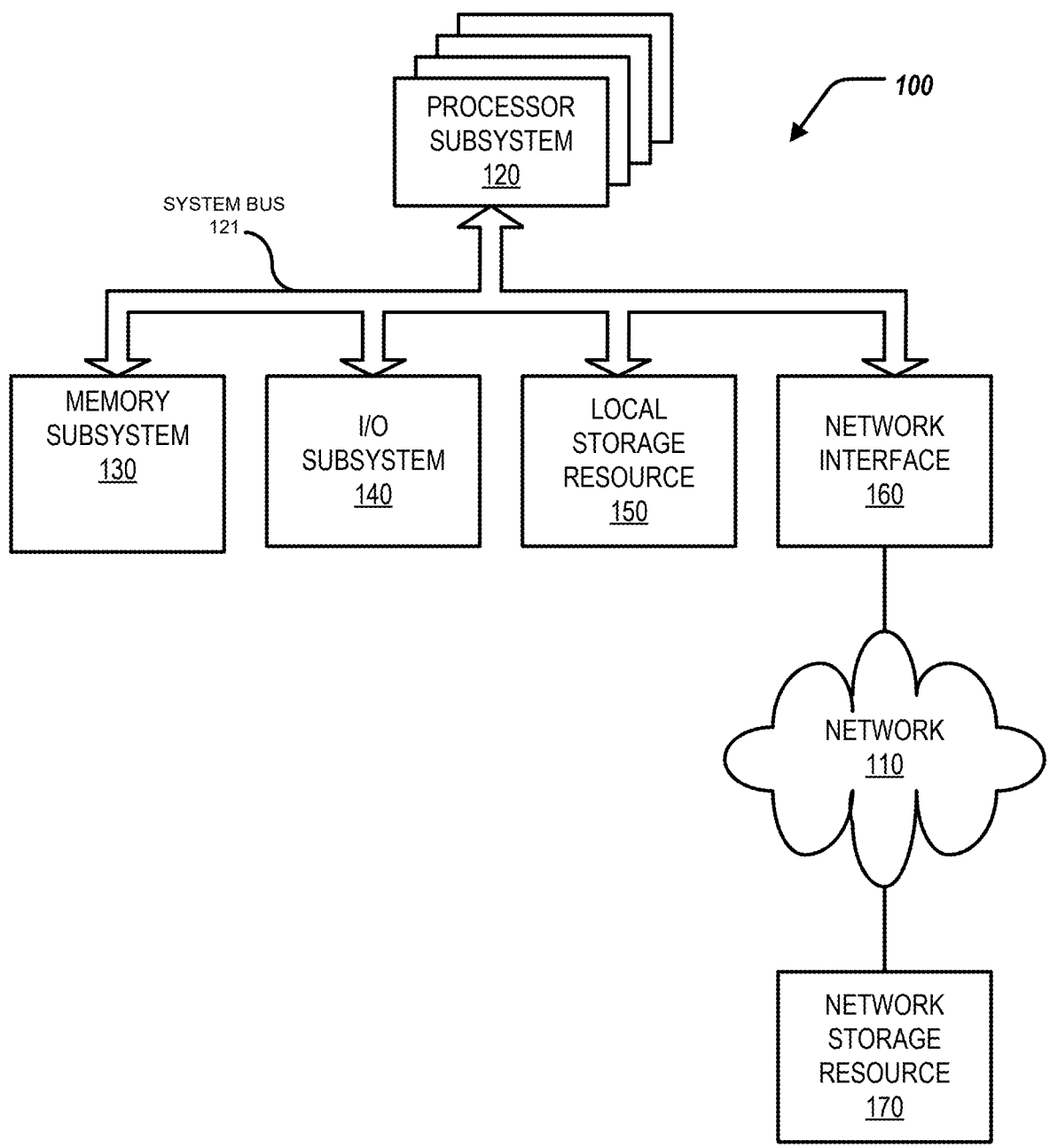
FIG. 1 is a block diagram of selected elements of an embodiment of an information handling system.

This disclosure discusses an apparatus for adjusting the depth of a module within a chassis. In short, a midplane assembly can be in varying positions with respect to the chassis. As a result, the "depth" of the midplane assembly can be automatically adjusted to an appropriate depth based on the type of pluggable module that is coupled to the midplane assembly. That is, the pluggable module can be of varying lengths, and the midplane assembly can vary a positioning thereof to accommodate pluggable modules of varying lengths, described further herein.

Specifically, this disclosure discusses an apparatus including a chassis, including a track; a midplane assembly, including: a connector; and locking mechanisms, wherein the midplane assembly is coupled to the chassis; a first pluggable module having a first length, the first pluggable module having first rails; a second pluggable module having a second length greater than the first length, the second pluggable module having second rails, each of the second rails having an extension; wherein when the first pluggable module is coupled to the connector of the midplane assembly, the first rails of the first pluggable module are engaged with the track of the chassis and the locking mechanisms engage the chassis to place the first pluggable module in a first position with respect to the chassis, wherein when the second pluggable module is coupled to the connector of the midplane assembly, the second rails of the second pluggable module are engaged with the track of the chassis and the extension of each of the second rails engage respective locking mechanisms of the midplane assembly to disengage the respective locking mechanisms from the chassis such that the midplane assembly is translatable with respect to the chassis to a second position differing from the first position.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-9 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
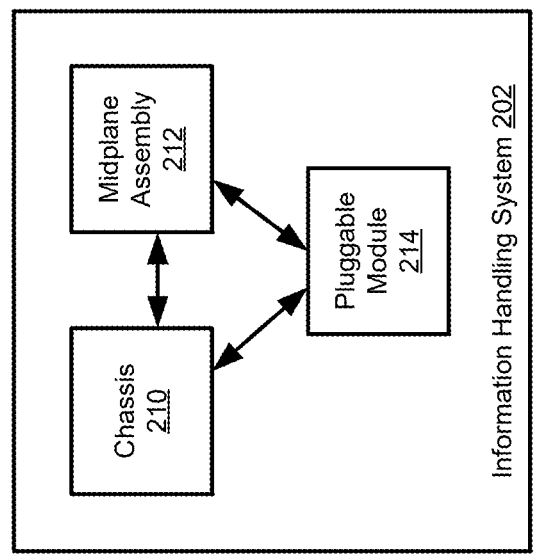
FIG. 2 illustrates a block diagram of an information handling system.

Turning to FIG. 2, FIG. 2 illustrates an environment 200 including an information handling system 202. The information handling system 202 can include a chassis 210, a midplane assembly 212, and a pluggable module 214. In some examples, the information handling system 202 is similar to, or includes, the information handling system 100 of FIG. 1.

The midplane assembly 212 can be coupled to the chassis 210. The midplane assembly 212 can be moveable coupled to the chassis 210. The pluggable module 214 can be coupled to the midplane assembly 212. The pluggable module 214 can be coupled to the chassis 210. The pluggable module 214 can be moveably coupled to the chassis 210.

In short, the midplane assembly 212 can be in varying positions with respect to the chassis 210. As a result, the "depth" of the midplane assembly 212 can be automatically adjusted to an appropriate depth based on the type of pluggable module 214 that is coupled to the midplane assembly 212. That is, the pluggable module 214 can be of varying lengths, and the midplane assembly 212 can vary a positioning thereof to accommodate pluggable modules 214 of varying lengths, described further herein.

Figure 3A:
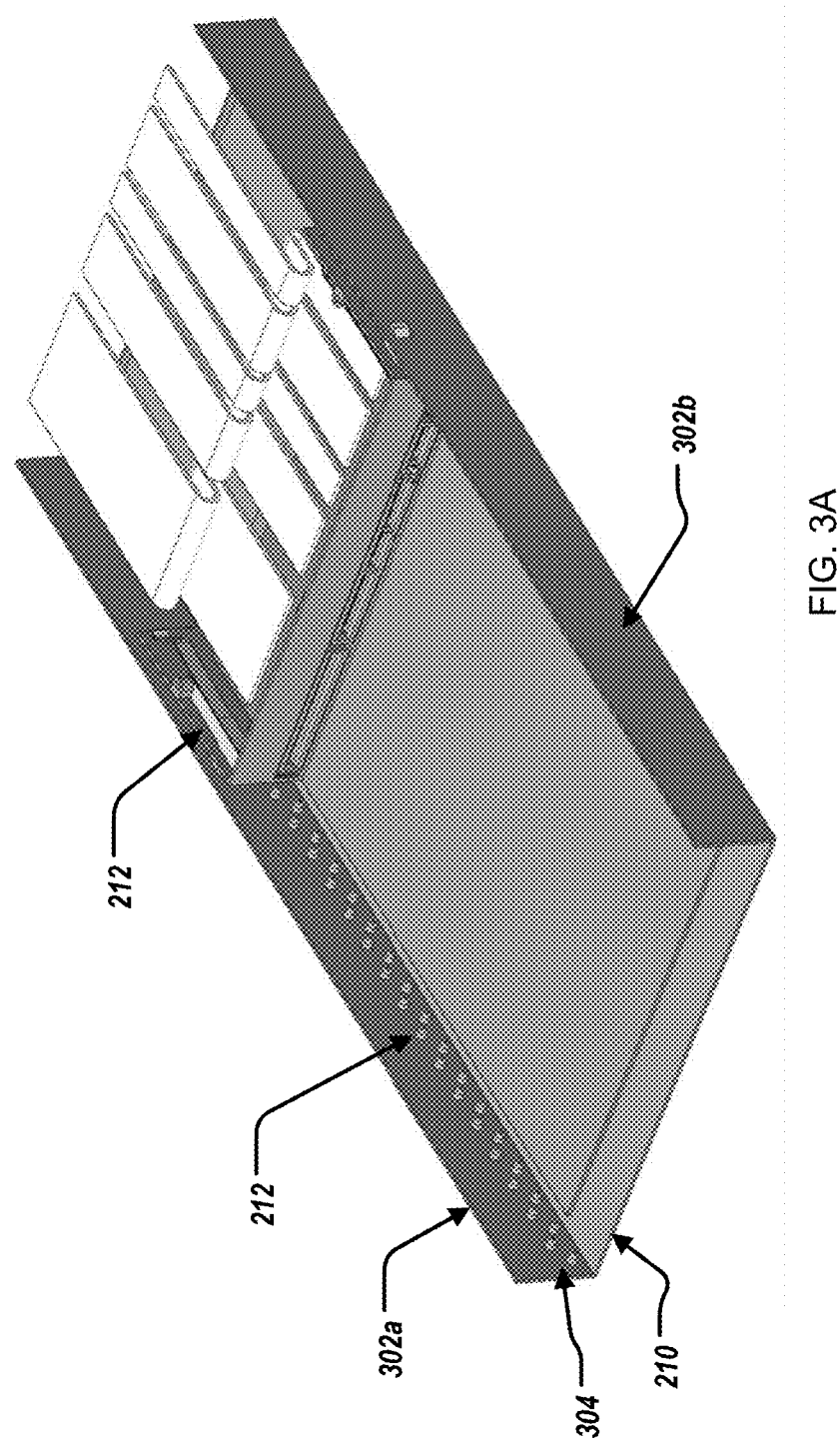
FIG. 3A illustrates a perspective view of a chassis and a midplane assembly.
Figure 3B:
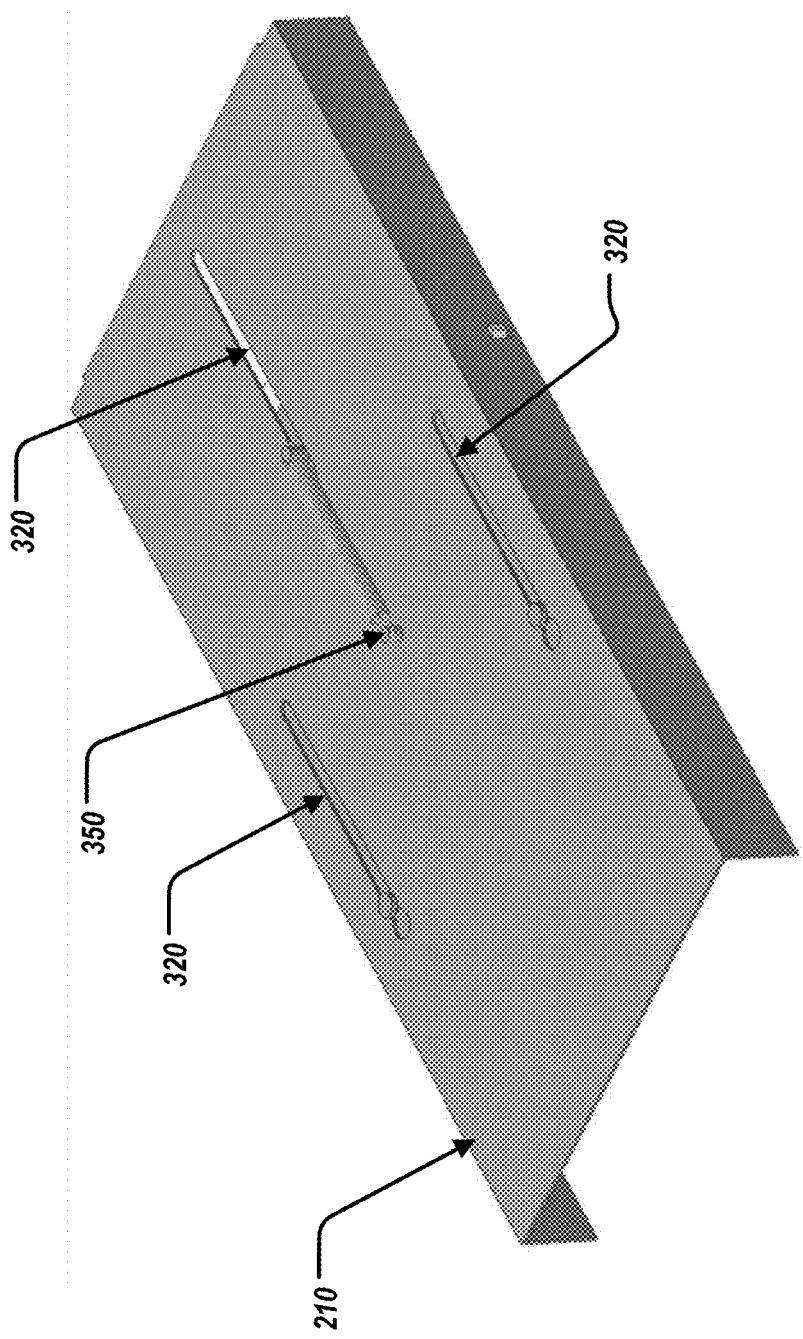
FIG. 3B illustrates a bottom-up perspective view of the chassis and the midplane assembly.
Figure 3C:
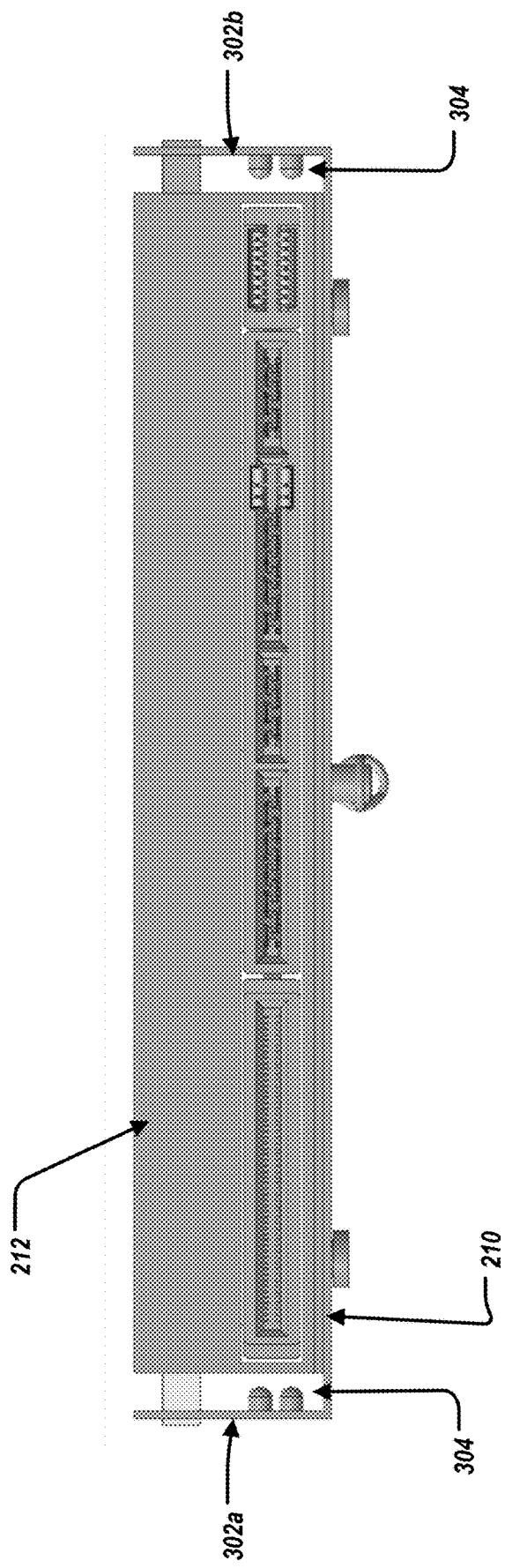
FIG. 3C illustrates a straight on view of the chassis and the midplane assembly.

FIG. 3A illustrates a perspective view of the chassis 210 and the midplane assembly 212; FIG. 3B illustrates a bottom-up perspective view of the chassis 210 and the midplane assembly 212; and FIG. 3C illustrates a straight on view of the chassis 210 and the midplane assembly 212. Referring to FIGS. 3A, 3B, 3C, the chassis 210 can include a first side 302a and a second side 302b (collectively referred to as sides 302). Each of the sides 302 can include a track 304. In some examples, the track 304 can include a plurality of protrusions extending from a surface of the respective side 302. For example, the protrusions can be spherical, or spherical-like, protrusions.

The chassis 210 can include a plurality of elongated openings 320. As illustrated, the chassis 320 includes three elongated openings 320; however, the chassis 210 can include any number of elongated openings 320. In some examples, the elongated openings 320 can include a circular portion at one end of the elongated opening 320 to facilitate coupling with the midplane assembly 212, described further herein.

The chassis 210 can further include a post 350.

Figure 4A:
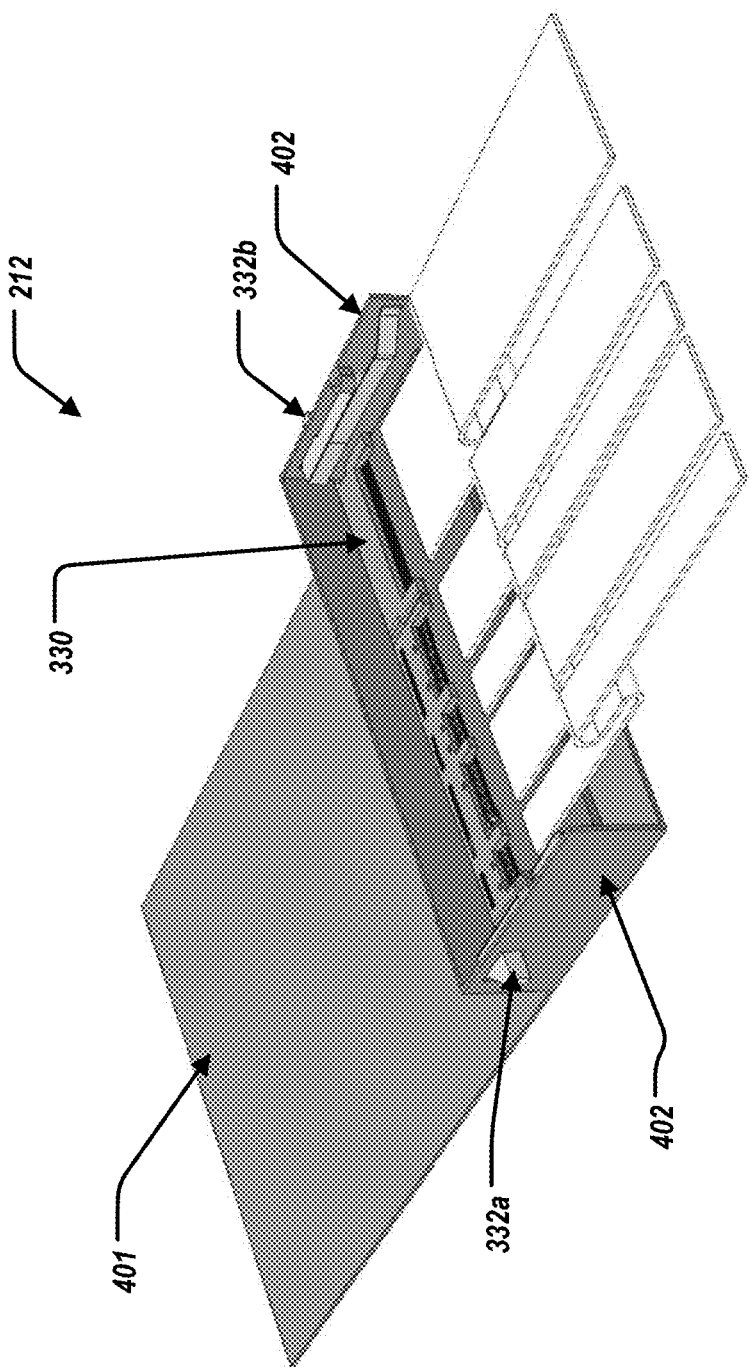
FIG. 4A illustrates a perspective view of the midplane assembly.
Figure 4B:
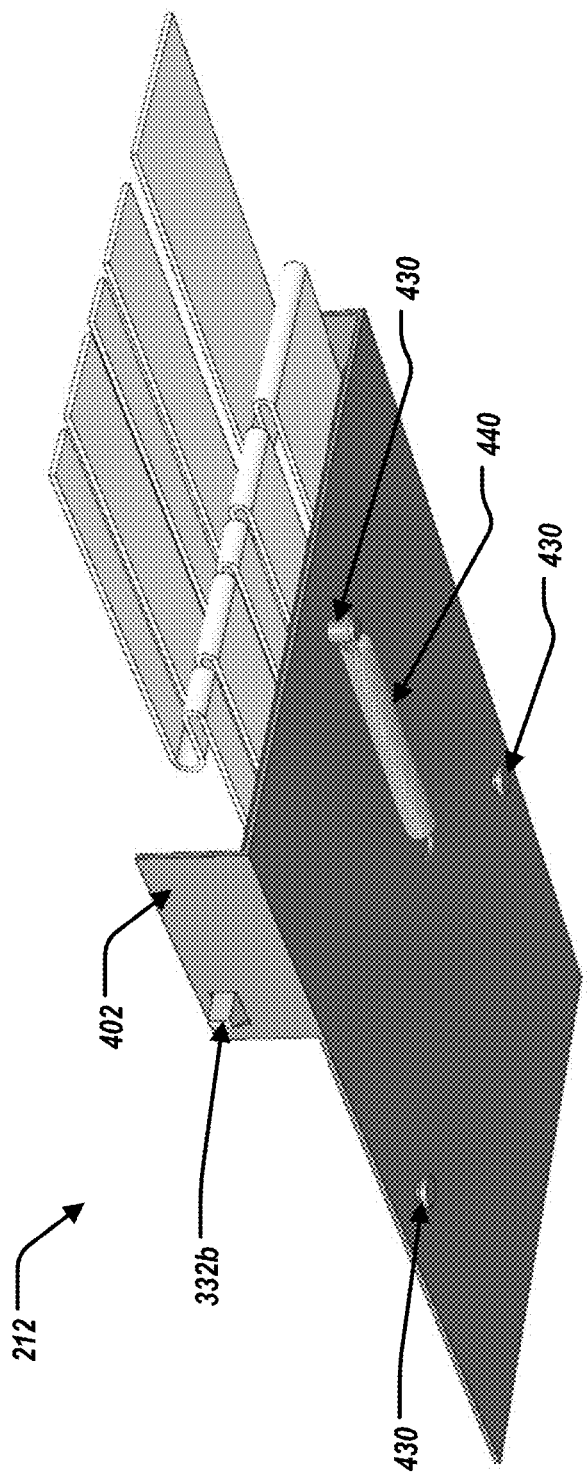
FIG. 4B illustrates a bottom up perspective view of the midplane assembly.
Figure 4C:
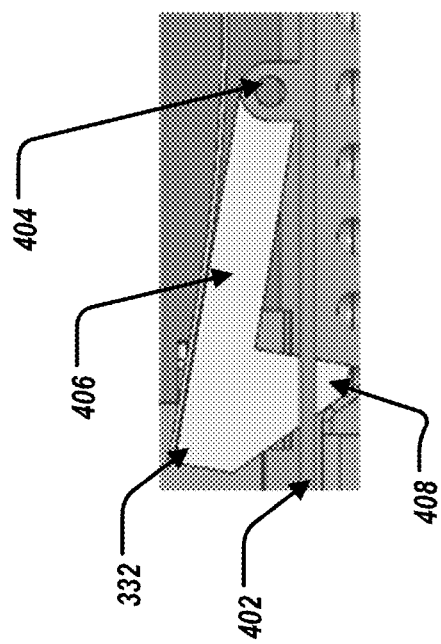
FIG. 4C illustrates a locking mechanism of the midplane assembly.

FIG. 4A illustrates a perspective view of the midplane assembly 212; and FIG. 4B illustrates a bottom up perspective view of the midplane assembly 212. Referring to FIGS. 4A, 4B, the midplane assembly 212 can include a plane 401, a connector 330, and locking mechanisms 332a, 332b (collectively referred to as locking mechanisms 332). The midplane assembly 212 is illustrated as having two locking mechanisms 332; however, the midplane assembly 212 can include any number of locking mechanisms 332. FIG. 4C illustrates the locking mechanism 332. Referring to FIGS. 4A-4C, the locking mechanism 332 can be pivotably coupled to the midplane assembly 212. Specifically, each of the locking mechanisms 332 are coupled to a respective flank 402 of the midplane assembly 212. The locking mechanism 332 can pivot about a pivot point 404 of the midplane assembly 212. That is, the locking mechanism 332 can rotate about the pivot point 404. In some examples, the locking mechanism 332 can include an arm 406 and a hooking member 408. In some examples, the locking mechanism 332 is a locking pawl.

Figure 4D:
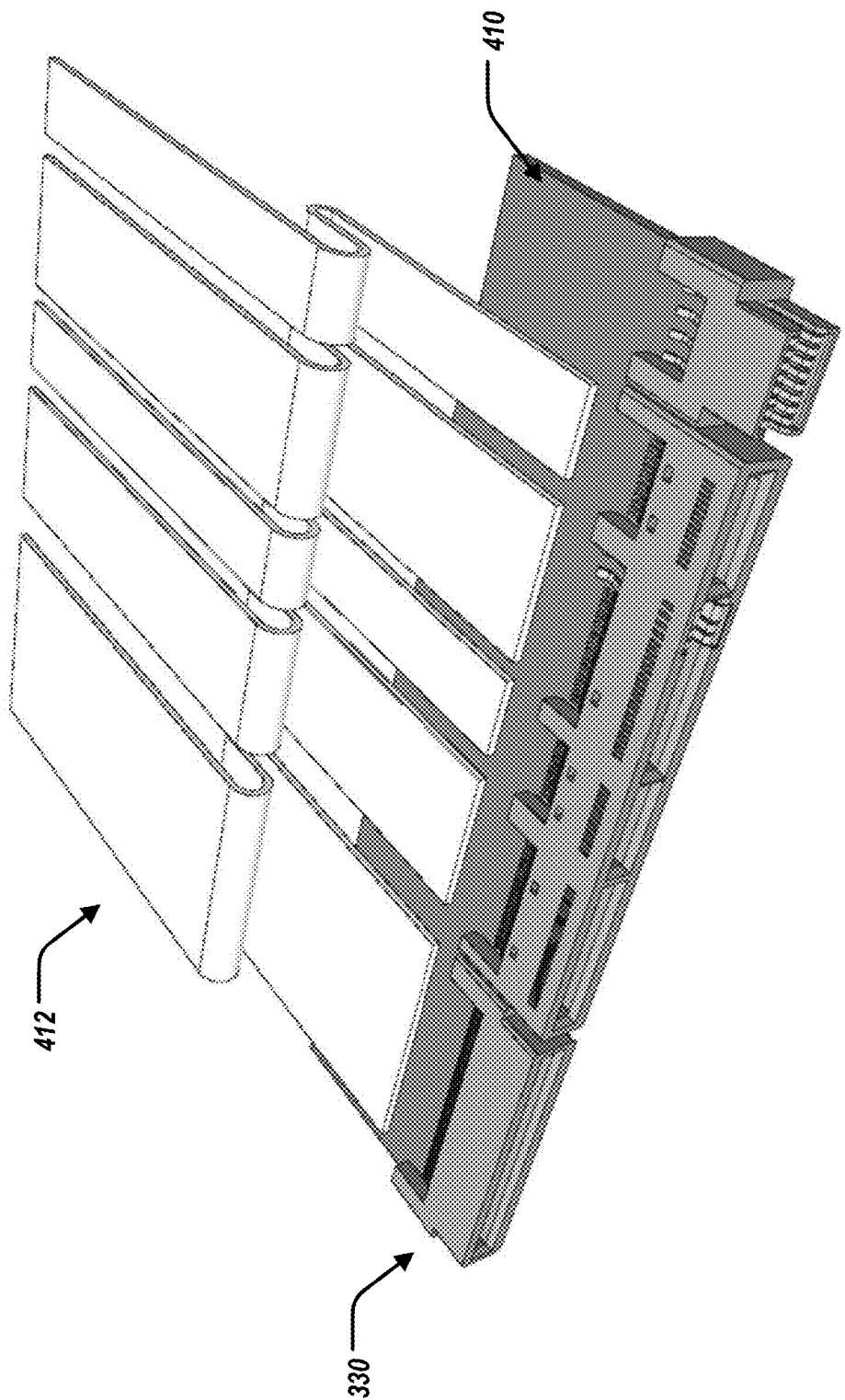
FIG. 4D illustrates a perspective view of the connector of the midplane assembly.

FIG. 4D illustrates a perspective view of a portion of the midplane assembly 212. The midplane assembly 212 can include the connector 330, and a printed circuit board (PCB) 410. In some examples, the PCB 410 can be coupled to the connector 330. In some examples, the PCB 410 can be coupled to a cable (or cables) 412 (e.g., low speed cables). In some examples, the cable (or cables 412) are coupled directly to the connector 330 (e.g., high speed cables). In some examples, some cables 412 are directly coupled to the connector 330 and some cables 412 are coupled to the connector 330 through the PCB 410. The cables 412 can be coupled to other computing components, such as the processor subsystem 120, the memory subsystem 130, the I/O subsystem 140, the local storage resource 150, and/or the network interface 160 of FIG. 1. The cables 412 can be coupled to a motherboard, or another PCB. The cables 412 can be high-speed cables between the PCB 410 and other expansion devices, such as Peripheral Component Interconnect Express (PCIe) expansion devices.

Referring to FIG. 4B, the midplane assembly 212 can include a plurality of protrusions 430. As illustrated, the midplane assembly 212 includes three elongated protrusions 430; however, the midplane assembly 212 can include any number of protrusions 430. In some examples, the number of protrusions 430 can be the same as the number of elongated openings 320 of the chassis 210.

The midplane assembly 212 can further include a spring 440.

Figure 5:
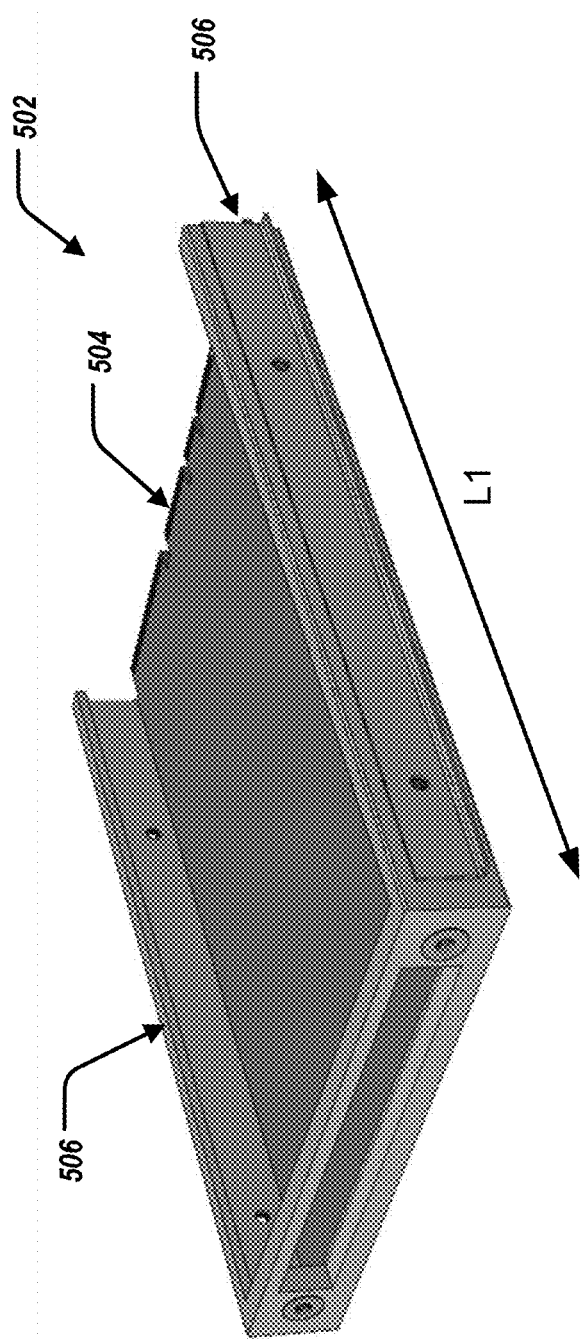
FIG. 5 illustrates a perspective view of a first pluggable module.

FIG. 5 illustrates a first pluggable module 502. The first pluggable module 502 can include a Pluggable Multi-purpose Module (PMM). The first pluggable module 502 can include the pluggable module 214 of FIG. 2. The first pluggable module 502 can include a first length L1. The first pluggable module 502 can further include a card edge connection 504, and first rails 506.

Figure 6:
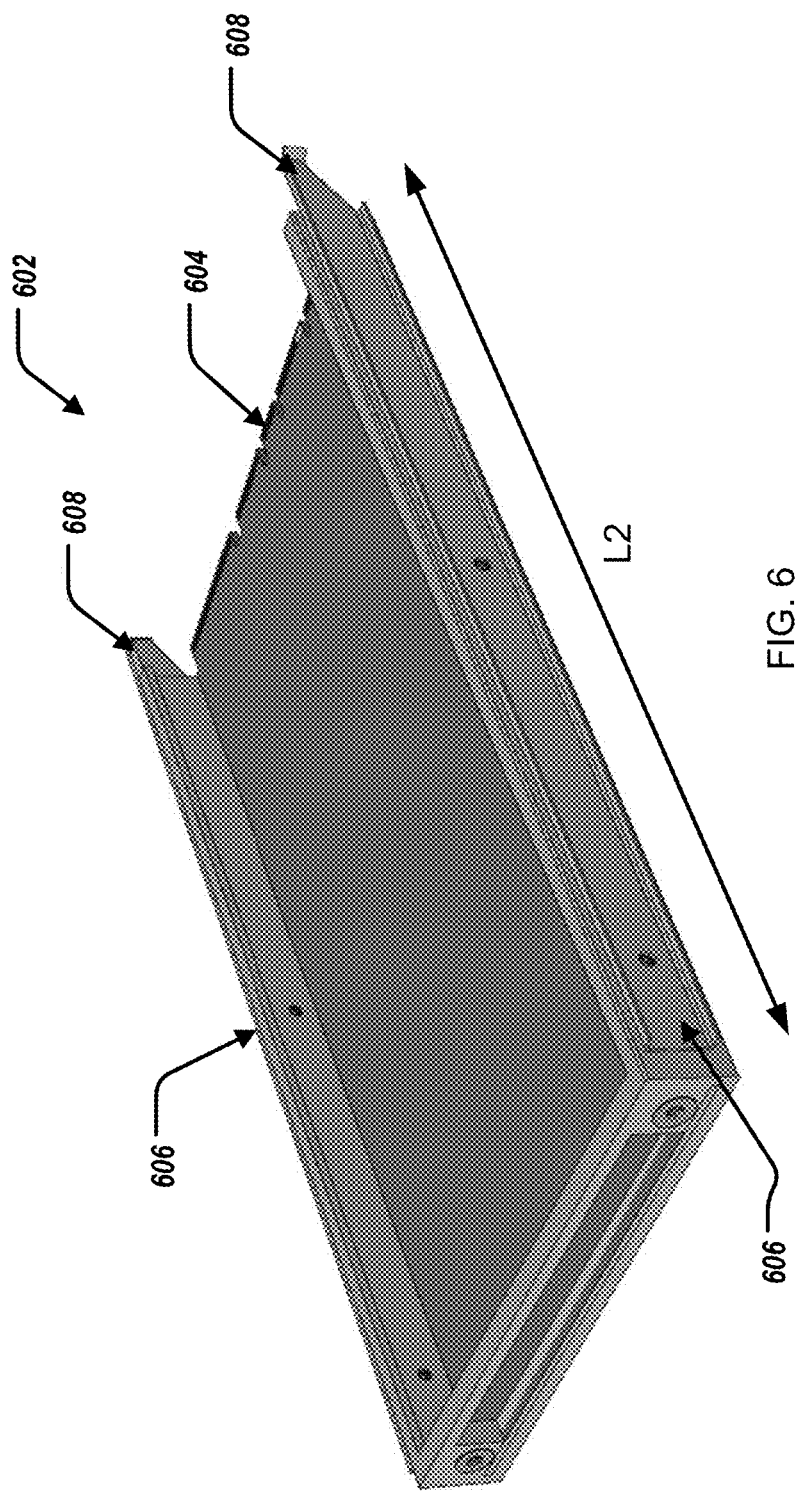
FIG. 6 illustrates a perspective view of a second pluggable module.

FIG. 6 illustrates a second pluggable module 602. The second pluggable module 602 can include a Pluggable Multi-purpose Module (PMM). The second pluggable module 602 can include the pluggable module 214 of FIG. 2. The second pluggable module 602 can include a second length L2. In some examples, the second length L2 of the second pluggable module 602 is greater than the first length L1 of the first pluggable module 502. The second pluggable module 602 can further include a card edge connection 604, and second rails 606. The second rails 606 of the second pluggable module 602 can further include extensions 608.

Figure 7:
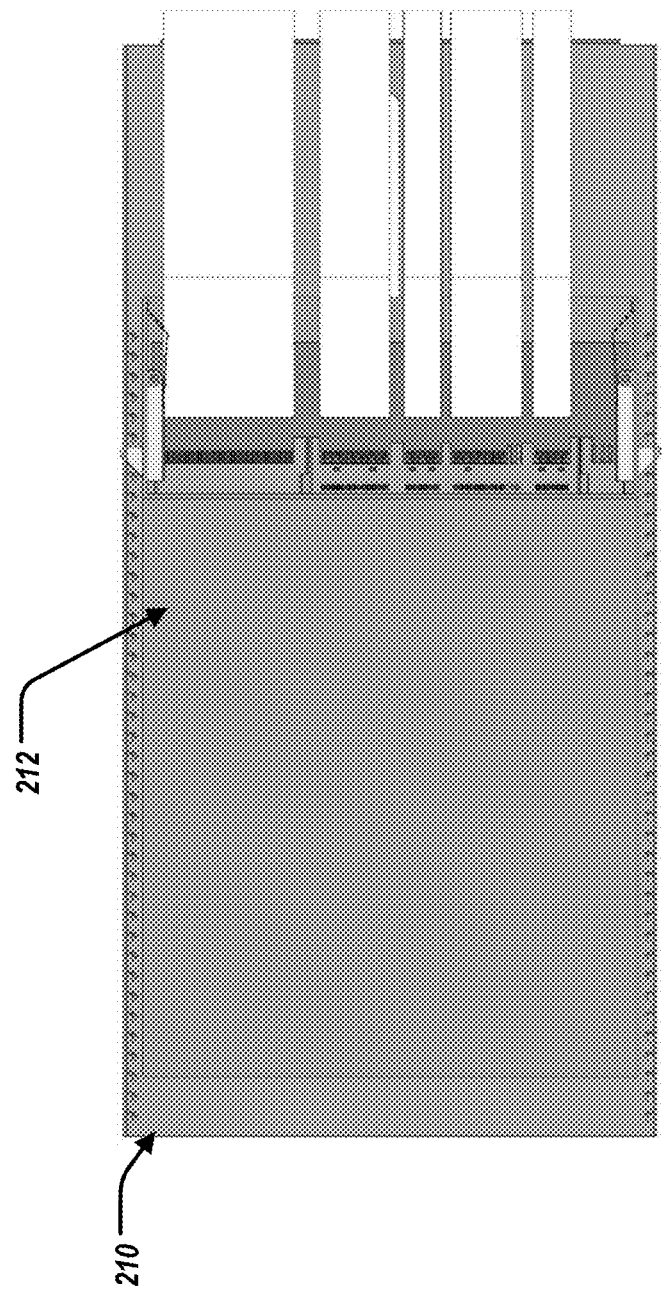
FIG. 7 illustrates a top down view of the chassis and the midplane assembly.

FIG. 7 is a top down view of the midplane assembly 212 coupled to the chassis 210. Referring to FIGS. 3B, 4B and 7, the midplane assembly 212 is coupled to the chassis 210. Specifically, the protrusions 430 of the midplane assembly 212 are positioned with respective elongated openings 320 of the chassis 210. To that end, the midplane assembly 212 is slideably or moveably coupled to the chassis 210. That is, the midplane assembly 212 can translate along the path of travel the elongated openings 320 provide when the protrusions 430 are positioned within the respective elongated openings 320. In other words, the elongated openings 320 guide the translation of the midplane assembly 212 with respect to the chassis 210. Furthermore, movement of the midplane assembly 212 with respect to the chassis 210 can be restricted by the locking mechanisms 332, described further herein.

Furthermore, the spring 350 can be coupled between the midplane assembly 212 and the chassis 210. Specifically, the spring 350 can be coupled to the post 350 of the chassis 210 and a protrusion 430 of the midplane assembly 212 positioned within the elongated opening 320. To that end, when either of the pluggable modules 502, 602 are not coupled to the midplane assembly 212—the midplane assembly 212 and/or chassis 210 are "empty"—the spring 350 can "draw" the midplane assembly 212 into an initial, or first, position, as shown in FIG. 7.

Figure 8A:
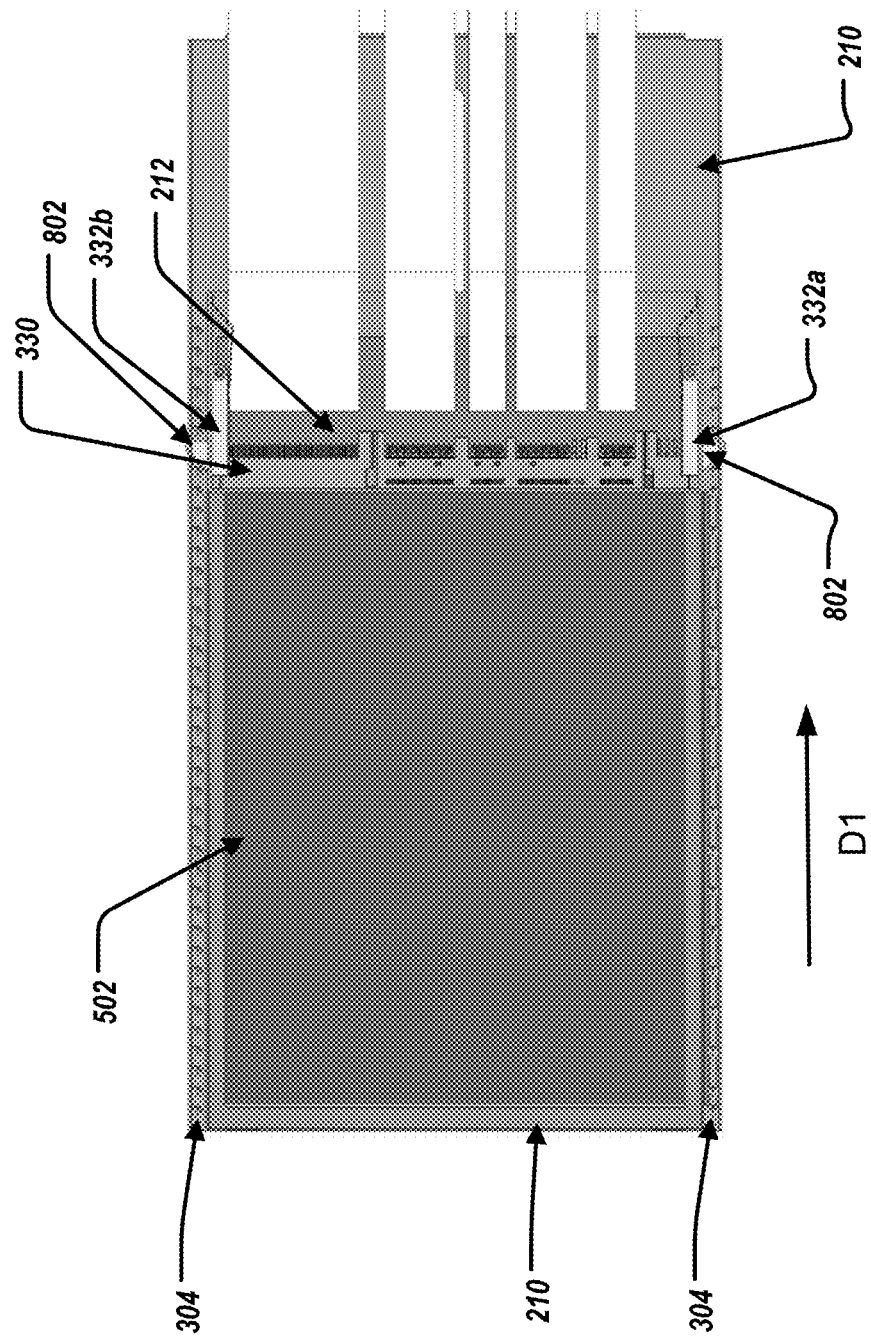
FIG. 8A illustrates a top down view of the first pluggable module coupled to the chassis and the midplane assembly.
Figure 8B:
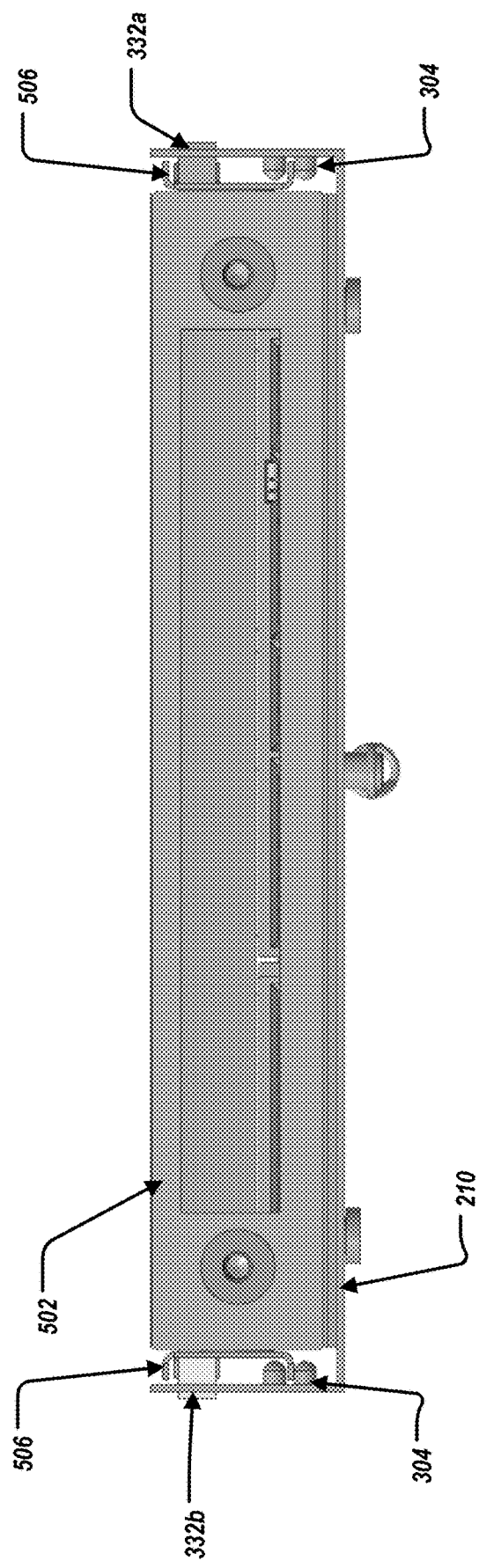
FIG. 8B illustrates a straight on view of the first pluggable module coupled to the chassis.

In some examples, the first pluggable module 502 is coupled to the connector 330 of the midplane assembly 212. FIG. 8A illustrates a top down view of the first pluggable module 502 coupled to the chassis 210 and the midplane assembly 212; FIG. 8B illustrates a straight on view of the first pluggable module 502 coupled to the chassis 210. Referring to FIGS. 8A, 8B, specifically, the first pluggable module 502 is coupled to the midplane assembly 212 by the card edge 504 of the first pluggable module 502 (shown in FIG. 5) inserted into the connector 330 of the midplane assembly 212. The first pluggable module 502 can be physically coupled to the midplane assembly 212 as well as communicatively and electrically coupled to the midplane assembly 212.

Furthermore, the first pluggable module 502 is coupled to the chassis 210. Specifically, the first rails 506 of the first pluggable module 502 are engaged with the track 304 of the chassis 210. Furthermore, the locking mechanisms 332 of the midplane assembly 212 can engage the chassis 210 to place the first pluggable module 502 in a first position with respect to the chassis 210. Specifically, the locking mechanisms 332 engage with openings 802 of the chassis 210. That is, referring to FIGS. 4C, 8A, 8B, the hooking members 408 of the locking mechanisms 332 can extend through the openings 802 to prevent movement/translation/sliding of the midplane assembly 212 and the first pluggable module 502 along the direction D1. As a result, the first pluggable module 502 is in the first position with respect to the chassis 210.

Figure 9A:
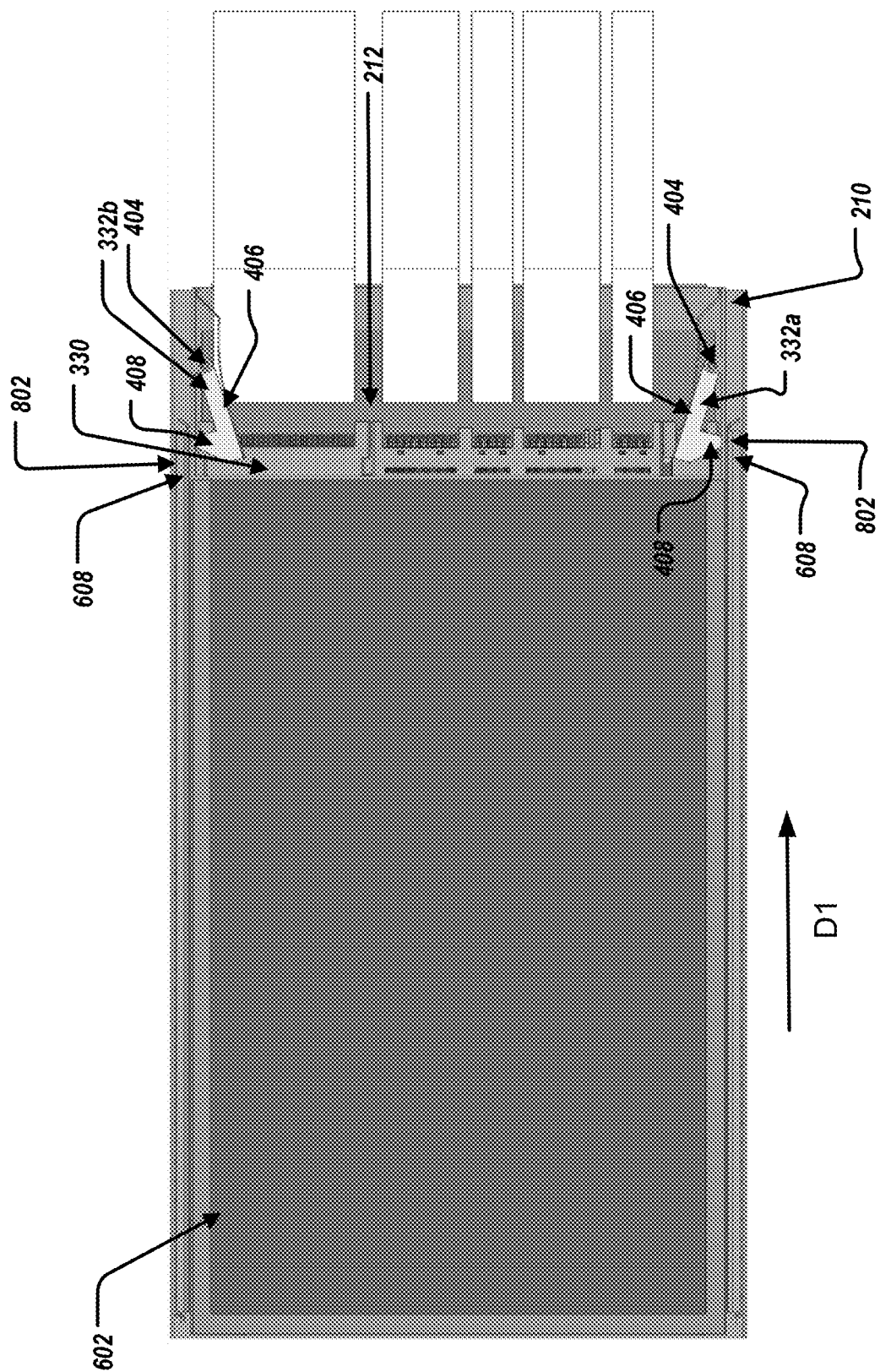
FIG. 9A illustrates a top down view of the second pluggable module coupled to the chassis and the midplane assembly.
Figure 9B:
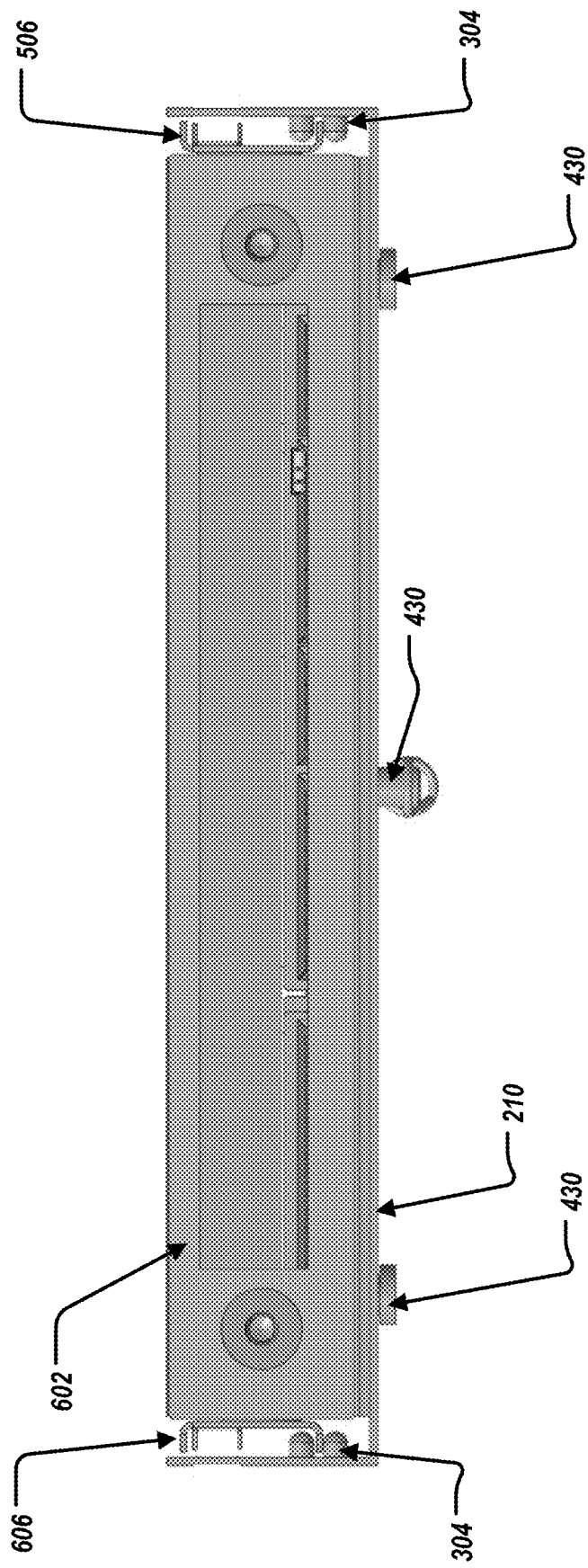
FIG. 9B illustrates a straight on view of the second pluggable module coupled to the chassis.

In some examples, the second pluggable module 602 is coupled to the connector 330 of the midplane assembly 212. FIG. 9A illustrates a top down view of the second pluggable module 602 coupled to the chassis 210 and the midplane assembly 212. FIG. 9B illustrates a straight on view of the second pluggable module 602 coupled to the chassis 210. Referring to FIGS. 9A, 9B, specifically, the second pluggable module 602 is coupled to the midplane assembly 212 by the card edge 604 of the second pluggable module 602 (shown in FIG. 6) inserted into the connector 330 of the midplane assembly 212. The second pluggable module 602 can be physically coupled to the midplane assembly 212 as well as communicatively and electrically coupled to the midplane assembly 212.

Furthermore, the second pluggable module 602 is coupled to the chassis 210. Specifically, the second rails 606 of the second pluggable module 602 are engaged with the track 304 of the chassis 210. Referring to FIGS. 4C, 6, 9A, 9B, furthermore, when the second rails 606 of the second pluggable module 602 are engaged with the track 304 of the chassis 210, the extensions 608 of the second rails 606 engage respective locking mechanisms 332 of the midplane assembly 212. When the extensions 608 of the second rails 606 engage respective locking mechanisms 332 of the midplane assembly 212, the extensions 608 disengage the respective locking mechanisms 332 from the chassis 210. Specifically, the extensions 608 disengage the respective locking mechanisms 332 from the chassis 210 by contacting the respective locking mechanism 332 and pivoting the respective locking mechanisms 332 about the pivot point 404. When the locking mechanisms 332 are pivoted about the pivot point 404, the arm 406 of each of the locking mechanisms 332 is rotated such that the hooking member 408 of each of the locking mechanisms 332 disengages from being positioned within the respective openings 802 of the chassis 210. As such, when the locking mechanisms 332 are disengaged from the chassis 210 (the hooking member 408 of each of the locking mechanisms 332 disengages from being positioned within the respective openings 802 of the chassis 210), the midplane assembly 212 is translatable with respect to the chassis 210 to a second position differing from the first position along the direction D1. Further, when the midplane assembly 212 translates with respect to the chassis 210 to the second position, the second pluggable module 602 is in the second position with respect to the chassis 210.

Moreover, the positioning of the protrusions 430 of the midplane assembly 212 within respective elongated openings 320 of the chassis 210 guide the translation of the midplane assembly 212 and the second pluggable module 602 with respect to the chassis 210 to the second position. Further, the chassis 210 can include a hard stop (not shown) such that when the second rails 606 and the extensions 608 of the second rails 606 contact the hard stops, further translation of the midplane assembly 212 and the second pluggable module 602 with respect to the chassis 210 is prevented.

In a further implementation, the information handling system 202 can include any number of midplane assemblies 212 with corresponding pluggable modules 214.

In a further implementation, the midplane assembly 212 can include any number of locking mechanisms 332 and a corresponding number of openings 802 of the chassis 210 (i.e., multiple "stops" or multiple positionings of any of the pluggable modules 214 with respect to any length of the pluggable modules 214).

In a further implementation, the pluggable module 214 can include multiple rails that engage with multiple respective tracks 304 of the chassis 210.

In some examples, when the pluggable module 214 (the pluggable modules 502 or 602) is disengaged from being coupled with the connector 330 of the midplane assembly 212, the spring 440 can translate the midplane assembly 212 to the initial positioning, as shown in FIG. 3A.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, including:
   a chassis, including a track;
   a midplane assembly, including:
     a connector; and
     locking mechanisms,
     wherein the midplane assembly is coupled to the chassis;
   a first pluggable module having a first length, the first pluggable module having first rails; and
   a second pluggable module having a second length greater than the first length, the second pluggable module having second rails, each of the second rails having an extension;
   wherein when the first pluggable module is coupled to the connector of the midplane assembly, the first rails of the first pluggable module are engaged with the track of the chassis and the locking mechanisms engage the chassis to place the first pluggable module in a first position with respect to the chassis,
   wherein when the second pluggable module is coupled to the connector of the midplane assembly, the second rails of the second pluggable module are engaged with the track of the chassis and the extension of each of the second rails engage respective locking mechanisms of the midplane assembly to disengage the respective locking mechanisms from the chassis such that the midplane assembly is translatable with respect to the chassis to a second position differing from the first position.

2. The apparatus of claim 1, the midplane assembly further includes a printed circuit board (PCB), the PCB coupled to the connector.

3. The apparatus of claim 2, further including a cable, the cable coupled between the PCB and a motherboard.

4. The apparatus of claim 1, further including a spring coupled between the midplane assembly and the chassis.

5. The apparatus of claim 1, the midplane assembly further includes a plurality of protrusions, and the chassis including a plurality of elongated openings, wherein the protrusions of the midplane assembly are positioned within respective elongated openings, the elongated openings guiding translation of the midplane assembly with respect to the chassis.

6. The apparatus of claim 1, the locking mechanisms are engaged with respective openings of the chassis when the first pluggable module is in the first position with respect to the chassis.

7. The apparatus of claim 6, the locking mechanisms are disengaged from the respective opening of the chassis when the second pluggable module is in the second position with respect to the chassis.

8. The apparatus of claim 7, wherein the locking mechanisms are pivotably coupled to the midplane assembly.

9. The apparatus of claim 8, the locking mechanisms are disengaged from the respective opening of the chassis when the extension of each of the second rails engage the respective locking mechanism to pivot the respective locking mechanisms from being engaged with the respective opening of the chassis.

10. The apparatus of claim 9, wherein each of the locking mechanisms is a locking pawl.

11. An apparatus, including:
a chassis, including a track;
a midplane assembly, including:
a connector; and
locking mechanisms,
wherein the midplane assembly is coupled to the chassis;
wherein when a first pluggable module is coupled to the connector of the midplane assembly, first rails of the first pluggable module are engaged with the track of the chassis and the locking mechanisms engage the chassis to place the first pluggable module in a first position with respect to the chassis, the first pluggable module having a first length,
wherein when a second pluggable module is coupled to the connector of the midplane assembly, second rails of the second pluggable module are engaged with the track of the chassis and an extension of each of the second rails engages respective locking mechanisms of the midplane assembly to disengage the respective locking mechanisms from the chassis such that the midplane assembly is translatable with respect to the chassis to a second position differing from the first position, the second pluggable module having a second length greater than the first length.

12. The apparatus of claim 11, the midplane assembly further includes a printed circuit board (PCB), the PCB coupled to the connector.

13. The apparatus of claim 12, further including a cable, the cable coupled between the PCB and a motherboard.

14. The apparatus of claim 11, further including a spring coupled between the midplane assembly and the chassis.

15. The apparatus of claim 11, the midplane assembly further includes a plurality of protrusions, and the chassis including a plurality of elongated openings, wherein the protrusions of the midplane assembly are positioned within respective elongated openings, the elongated openings guiding translation of the midplane assembly with respect to the chassis.

16. The apparatus of claim 11, the locking mechanisms are engaged with respective openings of the chassis when the first pluggable module is in the first position with respect to the chassis.

17. The apparatus of claim 16, the locking mechanisms are disengaged from the respective opening of the chassis when the second pluggable module is in the second position with respect to the chassis.

18. The apparatus of claim 17, wherein the locking mechanisms are pivotably coupled to the midplane assembly.

19. The apparatus of claim 18, the locking mechanisms are disengaged from the respective opening of the chassis when the extension of each of the second rails engage the respective locking mechanism to pivot the respective locking mechanisms from being engaged with the respective opening of the chassis.

20. The apparatus of claim 19, wherein each of the locking mechanisms is a locking pawl.

* * * * *